US012710402B2

(12) United States Patent
Kraus et al.

(10) Patent No.: US 12,710,402 B2
(45) Date of Patent: Aug. 18, 2026

(54) ATMOSPHERIC TRIPHASIC CHROMATOGRAPHY (ATC) METHOD

(71) Applicants: Grant Andrew Kraus, Oxford, MI (US); Andrew Harold Kraus, Oxford, MI (US); Gary Leroy Krause, Ortonville, MI (US); Brian James Brougham, Oxford, MI (US)

(72) Inventors: Grant Andrew Kraus, Oxford, MI (US); Andrew Harold Kraus, Oxford, MI (US); Gary Leroy Krause, Ortonville, MI (US); Brian James Brougham, Oxford, MI (US)

( * ) Notice: Subject to any disclaimer, the term of this patent is extended or adjusted under 35 U.S.C. 154(b) by 330 days.

(21) Appl. No.: 17/222,943

(22) Filed: Apr. 5, 2021

(65) Prior Publication Data

US 2022/0317097 A1 Oct. 6, 2022

(51) Int. Cl.

| | |
|---|---|
| ***G01N 30/06*** | (2006.01) |
| ***B01D 11/02*** | (2006.01) |
| *G01N 30/02* | (2006.01) |

(52) U.S. Cl.

CPC ......... *G01N 30/06* (2013.01); *B01D 11/0284* (2013.01); *B01D 11/0288* (2013.01); *B01D 11/0292* (2013.01); *G01N 2030/022* (2013.01); *G01N 2030/062* (2013.01); *G01N 2030/065* (2013.01)

(58) Field of Classification Search

CPC ............. G01N 30/06; G01N 2030/022; G01N 2030/062; G01N 2030/065; B01D 11/0284; B01D 11/0288; B01D 11/0292

See application file for complete search history.

(56) References Cited

U.S. PATENT DOCUMENTS 4,188,495 A * 2/1980 Althuis .................. C07C 45/71 560/255
2018/0179564 A1* 6/2018 Winnicki .............. C12M 41/12
2021/0309629 A1* 10/2021 Durst .................. B01D 9/0054

FOREIGN PATENT DOCUMENTS

WO WO-02069993 A1 * 9/2002 ............ A61K 31/05

* cited by examiner

*Primary Examiner* — John E Breene
*Assistant Examiner* — Alex T Devito
(74) *Attorney, Agent, or Firm* — WARNER NORCROSS + JUDD LLP

(57) ABSTRACT

Atmospheric Triphasic Chromatography (ATC) method comprising the steps introducing a raw plant material containing cannabinoids into a non-polar solvent, dissolving the cannabinoids extracted from the raw plant material in the non-polar solvent and removing the raw plant material to obtain a target solution, performing potency analysis and cannabinoid extract profile analysis of the target solution. The method further includes the steps of preparing an aqueous caustic solution and mixing the target solution with the aqueous caustic solution to obtain a mixture followed by separating the mixture into a first phase solution and a second phase solution, and removing the first phase solution to obtain a caustic target solution and acidifying the caustic target solution to produce precipitation of an undesirable compound in the caustic target solution.

11 Claims, 8 Drawing Sheets

ATMOSPHERIC TRIPHASIC CHROMATOGRAPHY (ATC) METHOD

FIELD OF INVENTION

The invention relates generally to *cannabis* oils and *cannabis* oil formulations, including *cannabis* oil compositions, and more particularly to process of *cannabis* extraction.

BRIEF DESCRIPTION OF THE INVENTION

The art is replete with various prior art design of vaping devices. There have been multiple standardized solvent based *cannabis* extraction methods utilized over the last 50 years. US Patent Publication No. 20180344661 to Finley, for example, discloses *cannabis* oil compositions, including *cannabis* oil compositions containing vitamin E, and methods for preparing the *cannabis* oil compositions. In some embodiments, the invention provides a method for preparing a *cannabis* oil composition comprising eluting cannabinoids from *cannabis* plant material with a solvent to produce an eluate; filtering the eluate with a filter to produce a filtrate; evaporating the solvent from the filtrate with a distiller to produce a distillate; and purging the distillate under conditions sufficient to remove residual solvent. In some embodiments, the method further includes mixing a quantity of vitamin B with the extract. Blended *cannabis* oil compositions containing mixtures of *cannabis* oil preparations are also described.

Another prior art reference, such as US Publication No. 20180007852 to Rose teaches a dry process for isolating clean glandular trichomes from a trichome bearing plant material, wherein the trichome bearing plant material is frozen at −20.degree. C. and subject to shattering and softening sequence. In addition, there exists among others ethanol-based extractions, CO2 super critical extractions, and the most popular and widely used form: butane bash oil commonly referred to as BHO. Butane Hash Oil extraction functions by flooding the prepared plant material with a pressurized solvent, butane. Butane is the solvent and dissolves the active chemical compounds, removing MC from the plant material. This liquid is then decanted from the plant material and dried separately, leaving concentrated THC behind as the butane evaporates.

There are several techniques manufacturers will use in an attempt to separate CBD/A from THC/A, chief among them fractional distillation. Fractional distillation uses subtle differences in the boiling points of compounds, commonly in conjunction with vacuum assistance, to separate cannabinoids as well as any terpenes or otherwise non-cannabinoid components. Through carefully controlled settings, many complicated glass or otherwise chemically compatible apparatuses have received much attention and serve as the most common current technique for such a separation within the industry. The main issue with the aforementioned processes include a lack of sufficient selectivity, scalability, nor optimization for commercialization in a competitive industry. Fractional distillation's working principle is based on finely tuned temperature and atmospheric control.

The EPA's dashboard provides insight into the tolerances necessary to achieve such a separation, with the boiling point of CBDA listed as 361 Celsius whereas THCA is listed at a comparatively low 105 Celsius. One might think that a temperature difference of nearly 260 degrees provides more than enough of a difference to take advantage, however, this is rarely the case as by boiling these cannabinoids to separate them one also decarboxylates them. This is where the process becomes complicated, and its disadvantages begin to show. The EPA lists the boiling point of CBD to be 160 Celsius, whereas THC is stated to be 157 Celsius, a difference of a mere 3 degrees.

The closeness of these two temperatures leads to what is oftentimes a less than ideal separation as not only is maintaining such a tight temperature zone difficult in and of itself, but it is known that temperature in viscous material such as oils or slurries is rarely homogeneous especially at a process scale. Next is the time required for fractional distillation to complete—relative to ATC fractional distillation is time consuming and inefficient, requiring hours of boiling as well as multiple stages to achieve a complete separation of components as may be desired. The actual processing itself and its time and effort is of course separate from the steps required beforehand to achieve an ideal product.

The input material for the process must be a form of extract, whether that be a crude ethanolic oil, a supercritical oil, a solventless hash, or any crude extraction commonly practiced on cannabinoid containing materials. This extract often will require an additional step of winterization, wherein it must be dissolved to ratio in a solvent— commonly high proof ethanol— and chilled to extremely low temperatures for long periods of time before a physical filtration to allow for the removal of plant fats and waxes which would otherwise interfere with the fractional distillation process. In terms of any scale, this makes continuous processing practically impossible and severely limits the throughput of any such manufacturer.

SUMMARY OF THE INVENTION

Atmospheric Triphasic Chromatography (ATC) method comprising the steps introducing a raw plant material containing cannabinoids into a non-polar solvent, dissolving the cannabinoids extracted from the raw plant material in the non-polar solvent and removing the raw plant material to obtain a target solution, performing potency analysis and cannabinoid extract profile analysis of the target solution. The method further includes the steps of preparing an aqueous caustic solution and mixing the target solution with the aqueous caustic solution to obtain a mixture followed by separating the mixture into a first phase solution and a second phase solution, and removing the first phase solution to obtain a caustic target solution and acidifying the caustic target solution to produce precipitation of an undesirable compound in the caustic target solution.

The next step includes mixing the non-polar solvent with the caustic target solution thereby dissolving the undesirable compound in the non-polar solvent to obtain a resulting mixture and separating the resulting mixture into a target phase solution and a non-polar phase solution containing the undesirable compound, and removing the non-polar phase solution containing the undesirable compound.

The method further includes the steps of acidifying the target phase solution thereby separating a target compound from the target phase solution, and mixing the non-polar solvent with the target phase solution thereby dissolving the target compound to produce a final mixture and separating the final mixture into a non-polar target phase solution containing the target compound and an acidic aqueous phase solution, and removing the acidic aqueous phase solution; and followed by removing the non-polar solvent from the non-polar target phase solution containing the target compound to obtain the target compound.

In another embodiment of the present method comprises the steps of introducing a raw plant material containing THCA, THC, CBN, CBC, CBGA, CBD and CBDA into a non-polar solvent, wherein the non-polar solvent comprises phenolic, aromatic or aliphatic hydrocarbons followed by dissolving the THCA, THC, CBN, CBC, CBGA, CBD and CBDA extracted from the raw plant material in the non-polar solvent, and removing the raw plant material to obtain a target solution. The following steps include preparing an aqueous caustic solution and mixing the target solution with the aqueous caustic solution to obtain a target mixture followed by separating the target mixture into (1) a first phase solution comprising a non-polar solvent solution containing decarboxylated cannabinoids, fats, oils and pigments, and (2) a second phase solution comprising an aqueous caustic solution containing the THCA, CBDA and CBGA, and removing the first phase solution to obtain a caustic target solution.

Alluding to the above, the method further includes the step of acidifying the caustic target solution to identify the THCA in the caustic target solution followed by the step of mixing the non-polar solvent with the caustic target solution to dissolve the THCA and to obtain a resulting mixture and then separating the resulting mixture into a target phase solution and a non-polar phase solution containing the THCA and removing the non-polar phase solution containing the THCA. The method further includes the steps of acidifying the target phase solution to identify the CBDA in the target phase solution, and mixing the non-polar solvent with the target phase solution to dissolve the CBDA and to produce a final mixture followed by separating the final mixture into a non-polar target phase solution containing the CBDA and an acidic aqueous phase solution, and removing the acidic aqueous phase solution and removing the non-polar solvent from the non-polar target phase solution containing the CBDA to obtain the CBDA in a form of CBDA oil.

The method presents a continuous process exhibiting high output, efficiency, precision, and scalability utilizing an atmospheric pressure chromatography method—without the use or specialty chromatography equipment, without requiring pressure or vacuum, it is run at room temperature or not far from it, no freezing in the form of winterization is required, and no heating is required, although at times it may be beneficial to slightly exceed room temperature.

This method produces high quality, precisely targeted extraction of specifically targeted chemicals. It can be as selective as extracting CBDA with zero accompanying THC, or THCA without the THC, chemicals with nearly identical molecular structures.

One of its primary advantages is that the method does not require specialty equipment. For example, Rotachrom, or more broadly centrifugal partition chromatography, is the closest existing technology, but includes its own set of issues including an exorbitant cost, time intensity, relative fragility, and not as selective as the ATC method in most cases. The inventive process is faster, more cost effective, and does not require the training or hiring of a niche specialist for its daily operation.

The inventive method fills a gap in the realm of *cannabis* extraction that has previously been left unfulfilled. The process allows to produce acidified cannabinoid extracts which are most typically in the form of oils at purities at or over 80% and efficiencies at or over 75%. This is achieved without the use of cumbersome, expensive, and technically challenging equipment described further in this document.

The utilization, or lack thereof, of modified pressures poses enormous benefits to the scalability of the process described. There is no requirement for pressure or vacuum rated vessels, there is no requirement for large and potentially dangerous machinery which is necessary to provide pressures or vacuums that may be utilized in other processes. It should go without saying that the process is not dependent on monitoring of pressure levels to reach desired efficiencies or purities. Rather, the process may be conducted at an atmospheric or naturally occurring pressure in any chemically compatible vessel which is both comparatively inexpensive and easy to maintain.

The use of a triphasic extraction method allows the process to be custom-tailored to the desired end product, as well as serving the purpose of acting as a chemical filter for undesirable impurities such as pesticides and heavy metals. In order for any such impurity to make its way through the process, it would need to exhibit extraordinary chemical properties and therefore makes the transfer of any such impurities highly unlikely. The process takes advantage of both the general propensity of cannabinoids to be soluble in non-polar phases, as well as the existence of its naturally occurring state as seen at the time of harvest with the presence of a carboxylic acid group. As the process moves along the state of the cannabinoids as their acidic version is further exploited, and once again their preference for non-polar phases allows them to be reclaimed in a purified and safe-to-consume manner whilst the leftover phases may be properly disposed of and/or reclaimed for later use.

To start, pH modification is a cornerstone of proper separation of any mixture of chemical components. As the process moves along, pH is monitored continuously as a requirement for the desired selectivity and also allows for real-time customization of said selectivity. As the phases explained in the previous paragraph move along, they may be thought of as a liquid gradient, those familiar with the art will recognize the benefit of such a gradient in allowing the separation of complex mixtures.

Where ATC becomes unique is that in common analytical techniques, pH modification and liquid gradient is not always enough to complete such a process in a time efficient manner. Those that may take advantage of these techniques also are often destructive or not available for the efficient reclamation of target compounds. In the process described here target compounds may be reclaimed at efficiencies equal to or in excess of 75%.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
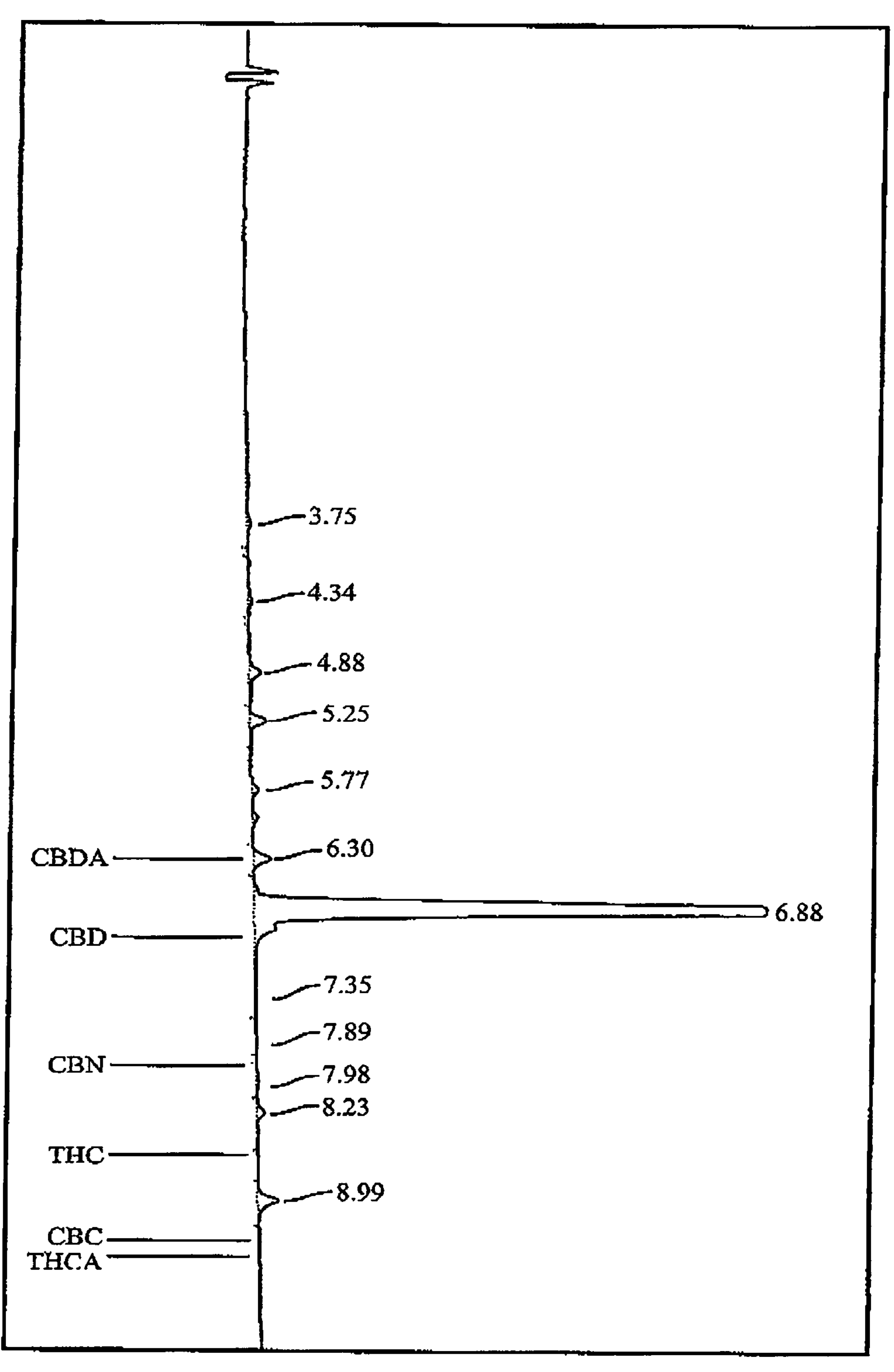
FIG. 1 presents a graphical view of a non-polar target solution after exposure to and separation from caustic target solution, one will notice that only decarboxylated cannabinoids remain in this solution.
Figure 2:
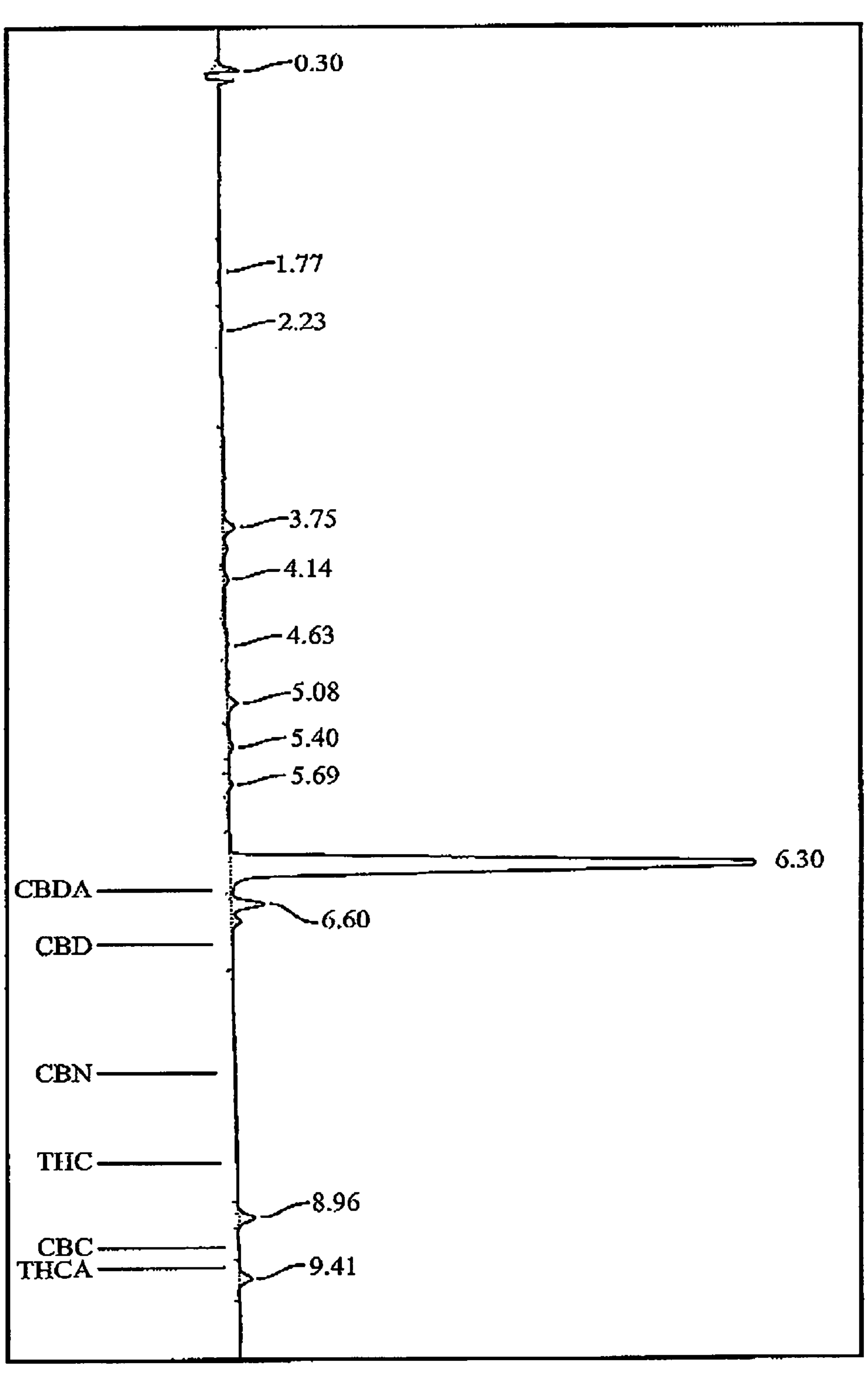
FIG. 2 presents a graphical view of a Caustic target solution before pH modification, note the presence of CBDA and THCA.
Figure 3:
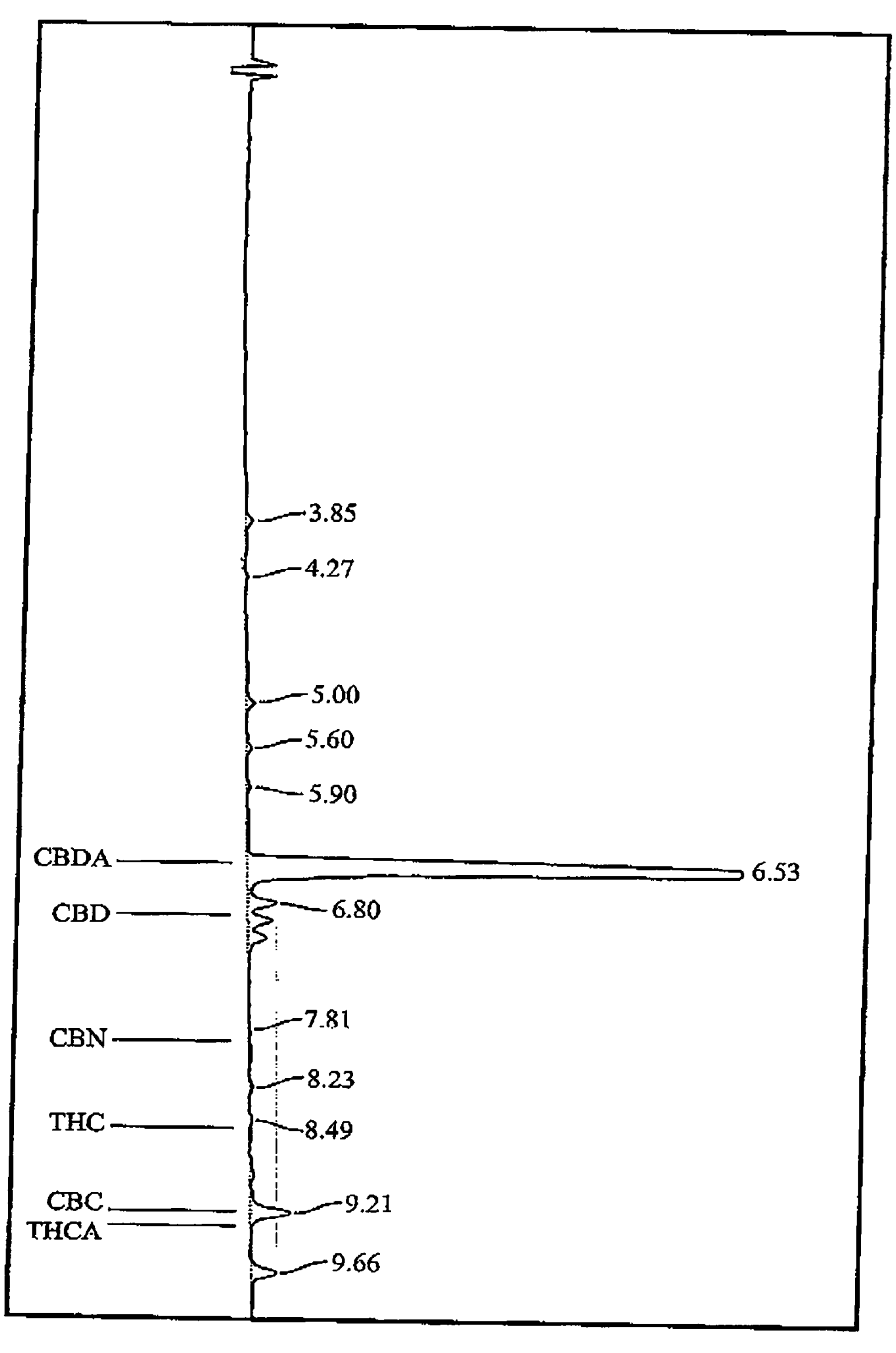
FIG. 3 presents a graphical view of a non-polar pH modification solvent used to remove precipitated undesirable chemicals, this phase also contains over 99% of all previously solubilized THCA and is marked for disposal.
Figure 4:
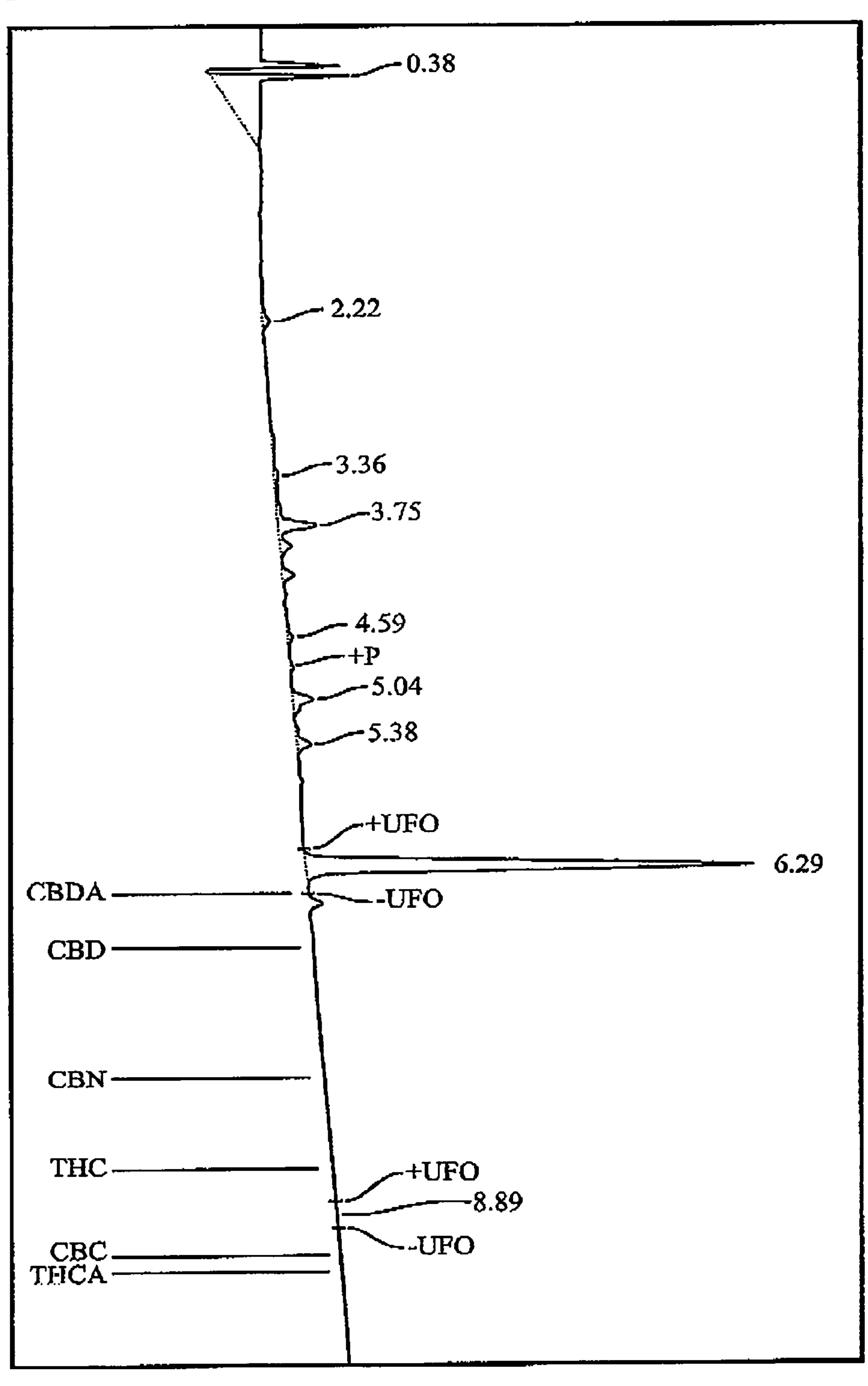
FIG. 4 presents a graphical view of Caustic target solution after separation from non-polar pH modification solvent and THCA has been removed. Once process is completed, the resulting oil is reflected in third party CoA 12/11.75 mode.
Figure 5:
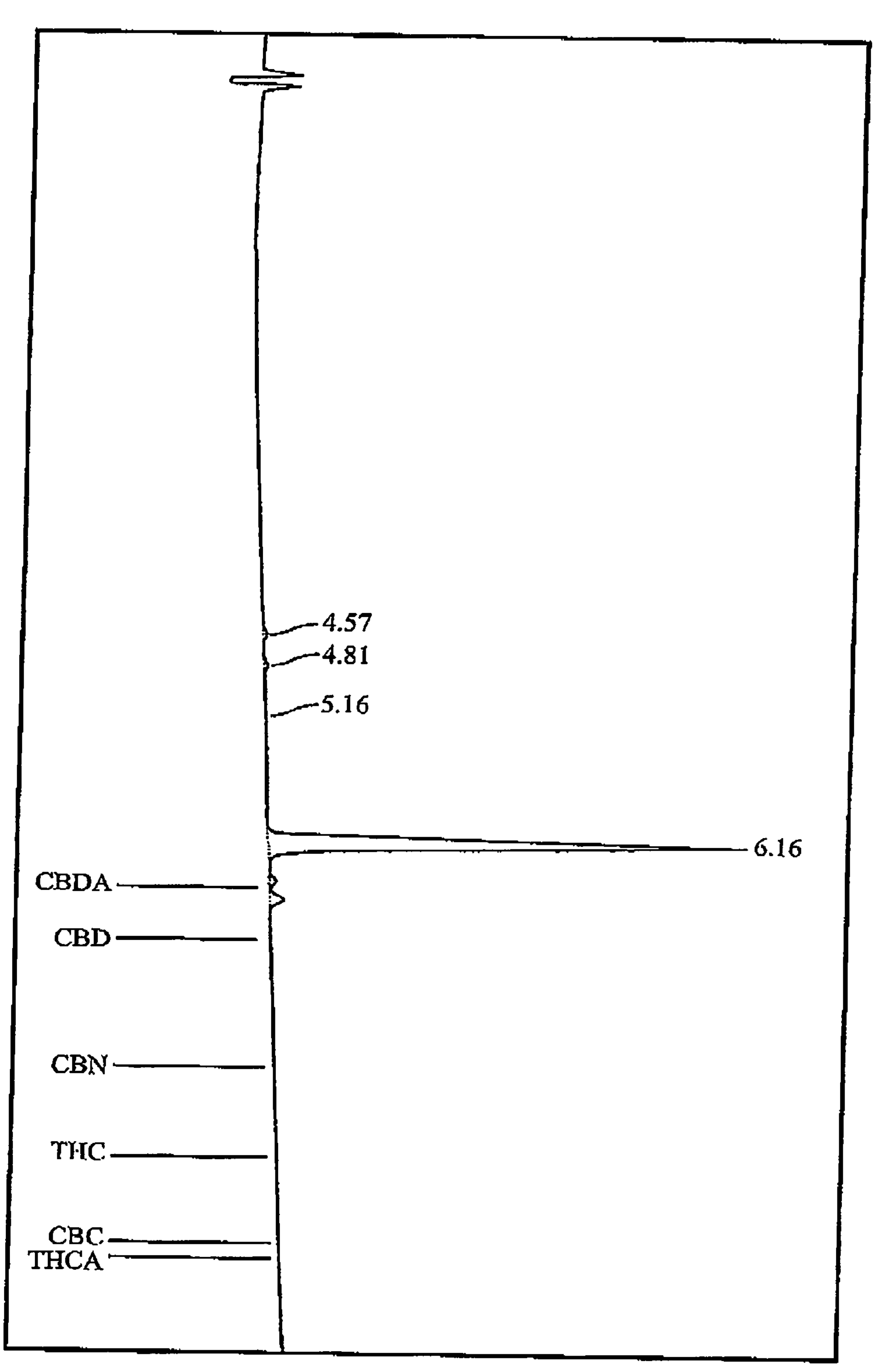
FIG. 5 presents a graphical view of a non-polar target solution after final acidification of the caustic target solution. At this stage the viscous oil is entirely dissolved. This material, when dried, produced the oil seen in third party CoA 2232020 Run 1.
Figure 6:
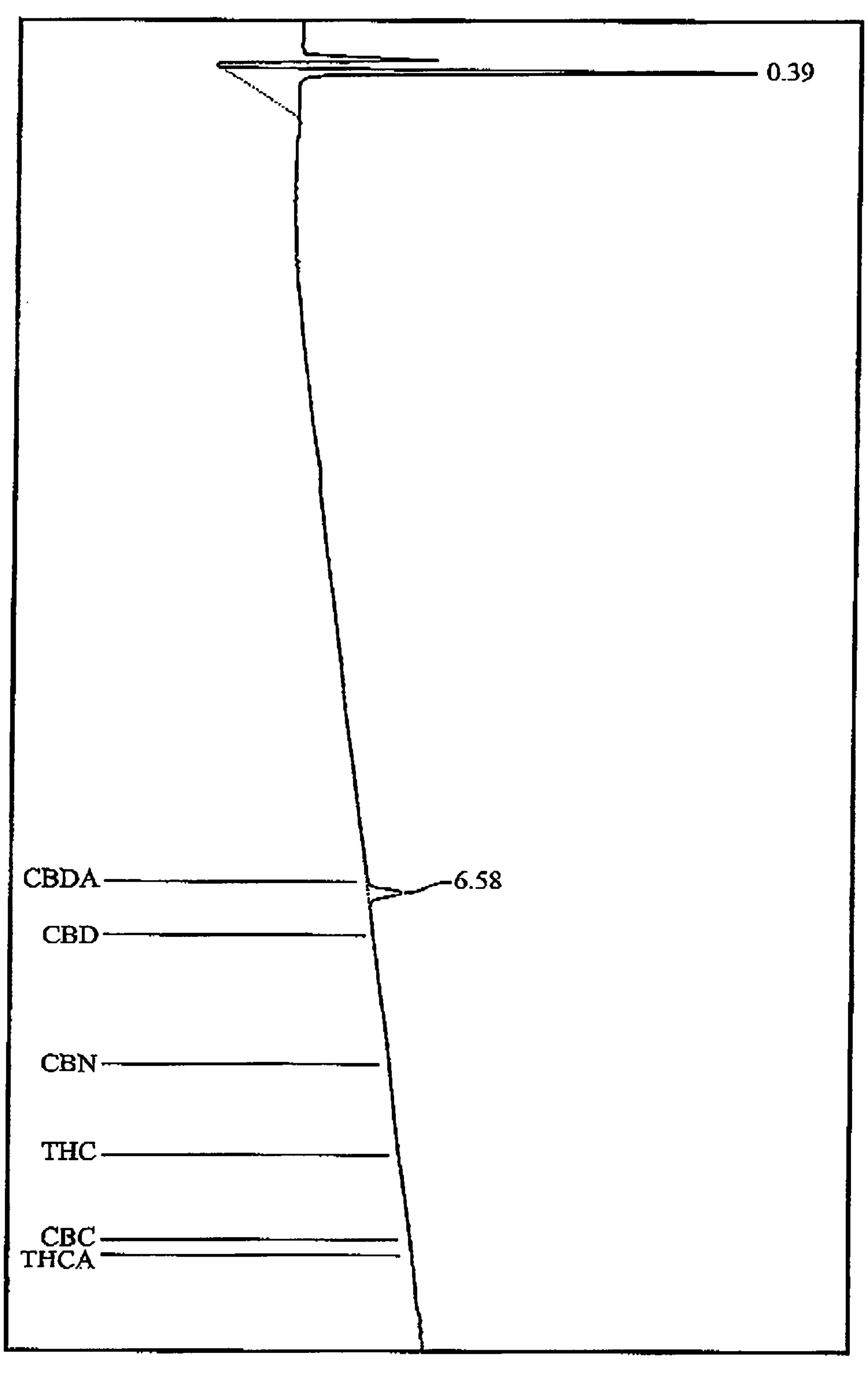
FIG. 6 presents a graphical view of acidified caustic target solution after separation from final non-polar target solution. All Cannabinoids have been removed and are not transferred into the nonpolar phase for final product reclamation.

Referring to description of the present invention, the words "inner", "inwardly" and "outer", "outwardly" refer to directions toward and away from, respectively, a designated centerline or a geometric center of an element being described, the particular meaning being readily apparent from the context of the description. Additionally, as used herein, the singular forms "a," "an," and "the" include plural referents unless the context clearly dictates otherwise.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments.

These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the tem "including" shall be interpreted to mean "including, but not limited to."

Figure 7A:
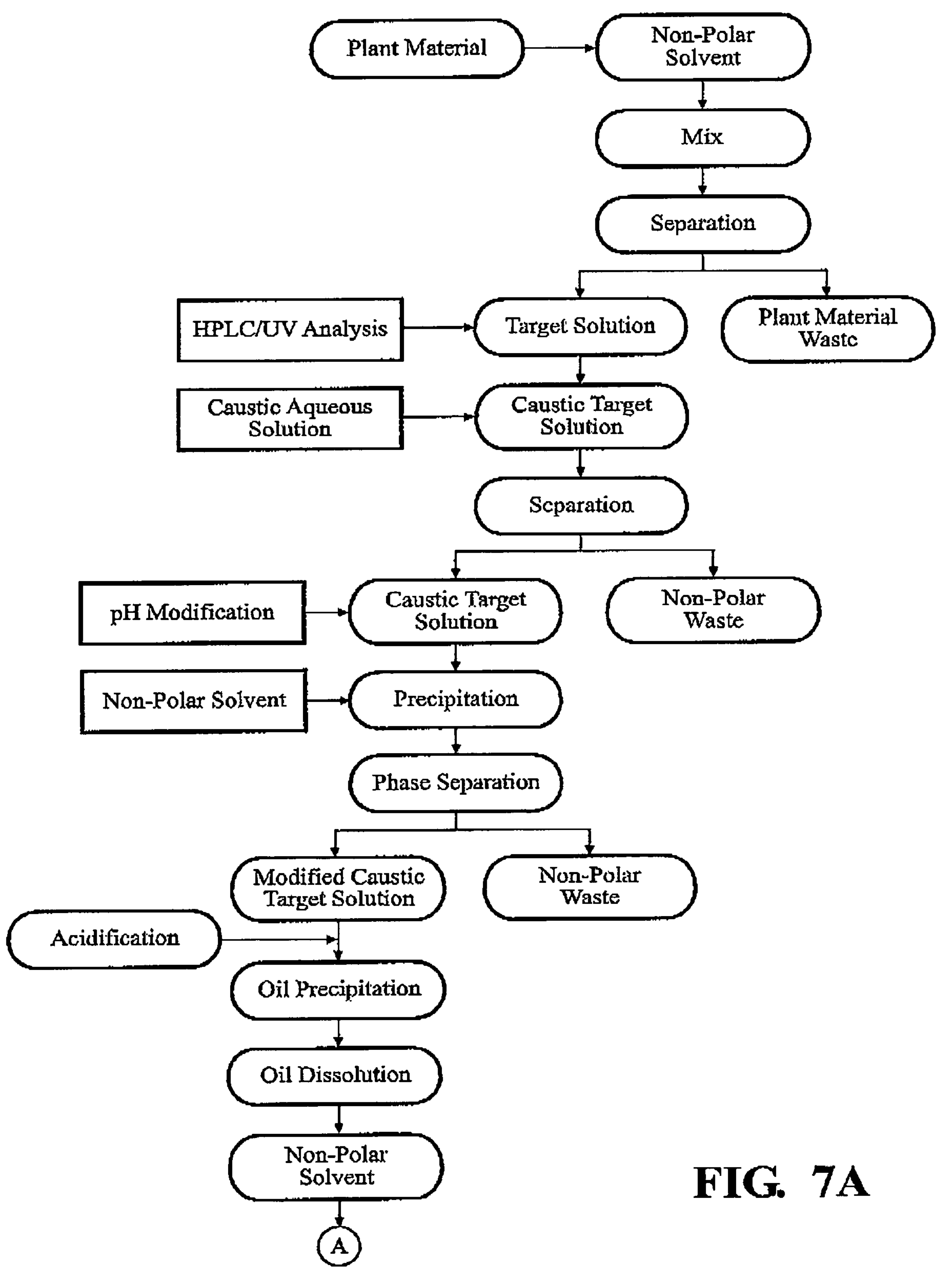
FIGS. 7A and 7B illustrate a schematic view of Atmospheric Triphasic Chromatography (ATC) method.
Figure 7B:
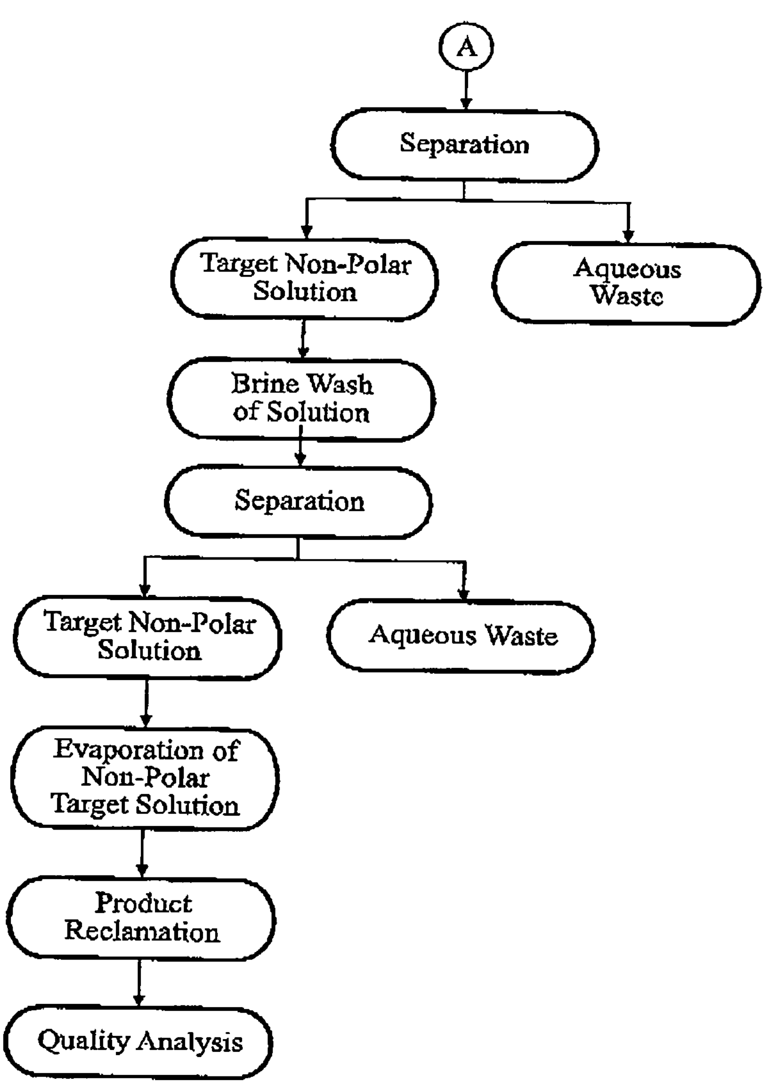

FIGS. 7A and 7B illustrate illustrates a schematic view of Atmospheric Triphasic Chromatography (ATC) method/process, generally indicated. The process begins with the introduction of raw plant material, such as *Cannabis sativa* spp. *Sativa*, commonly known as industrial Hemp (either in a dried or wet form), into a non-polar solvent, which may include but is not necessarily limited to phenolic, aromatic and aliphatic hydrocarbons that may be available either as a straight chain or isomerized mixture, to extract cannabinoids, among others, contained in the raw plant material. The ratio of the non-polar solvent to the raw plant material may be variable depending on the desired end product and can range anywhere from 5 ml/gram to 20 ml/gram. Extraction times may vary depending on the input material's particle size and potency and therefore can take anywhere from 30 minutes to 2 hours.

It will be understood that the raw plant material contains the following compounds: cannabinoids, such as tetrahydrocannabinolic acid (THCA), tetrahydrocannabinol (THC), cannabinol (CBN), cannabichromene (CBC), cannabigerolic acid (CBGA), cannabidiol (CBD) and cannabidiolic acid (CBDA), pigments, oils and fats, and other impurities. Once cannabinoids have been extracted and/or sufficiently solubilized into the non-polar solvent, separation or removal of the plant material from such non-polar solvent may be conducted in any manner as typically known to those familiar with the art, including but not necessarily limited to gravity filtration, vacuum filtration, centrifugation, and decantation.

After the raw plant material is separated or removed from the resulting solvent mixture with the cannabinoid compounds of the raw plant material dissolved in it (hereinafter referred to as the "target solution"), the target solution must undergo analyses to determine its potency (i.e., the concentration of all or total count of the extracted cannabinoids in the solution, measured in mg/ml) and cannabinoid extract profile (i.e., the amount of each of the extracted cannabinoids in proportion to one another, measured in mg/ml), as the cannabinoids extract profile will be broad and non-selective at this stage. It will be appreciated that both potency and cannabinoid extract profile analyses of the target solution may be performed or conducted by using HPLC/UV analysis.

The target compound of the inventive method described herein is to extract CBDA cannabinoid compound. As discussed above, the potency of the target Solution is determined in the potency analysis, such that the next step of preparing an aqueous caustic solution may now begin. This step is meant to be extremely caustic or basic and the materials used in this phase must be ratiometrically calculated, i.e., based on the determined total count of the extracted cannabinoids in the solution. The aqueous caustic solution is made by combining distilled water with a strong base, such as NaOH, KOH, and etc.

The aqueous caustic solution is made by first converting or scaling up or down the total count of the extracted cannabinoids in mg/ml, as determined in the previous step, according to the batch size that is being used to make the aqueous caustic solution, and then multiplying the result by the 0.5996 factor to determine the weight of the caustic solution (in relation to distilled water) to be used to prepare the desired batch of the aqueous caustic solution. It will be understood that the aqueous caustic solution batch so prepared will constitute a total volume representing 10% to 100% the volume of the target solution recovered in the initial extraction and separation step.

The aqueous caustic solution and the target solution are then introduced and mixed vigorously for between 5 and 45 minutes at room temperature to obtain a mixture, which separates outs or phases out over time into two separate phases after the mixing is stopped. The top phase of the mixture is the non-polar solvent containing fats, oils, pigments, decarboxylated cannabinoids, such as THC, CBN, CBC and CBD, and other impurities. The bottom phase of the mixture is the aqueous caustic solution containing the desired cannabinoids, such as the THCA, CBDA, and CBGA, that are present in the bottom phase as a result of being transferred from the target solution into the bottom phase.

The next step is to distinctly separate the two phases of the mixture by, for example, a centrifuge to accelerate the separation of the two phases. Once the separation is completed, the top phase is decanted or removed. The pH of the remaining caustic aqueous phase with the desired cannabinoids present (hereinafter referred to the "caustic target solution") will be variable depending on the saturation of acidic cannabinoids contained within the solution, but shall remain at a pH between 12.8 and 14.

At this point, desired end product will determine further processing steps. In order to do so, the caustic target solution will be modified with any acidic substance or compound, including but not necessarily limited to organic, inorganic, polyprotic, or mineral acids, to a pH within the range of 10.5-12. Such a change produces precipitation of undesirable chemicals including namely the THCA. Then a non-polar solvent, which may include but is not necessarily limited to phenolic, aromatic and aliphatic hydrocarbons that may be available either as as straight chain or isomerized mixture, is used to remove the THCA. The THCA is dissolved in the non-polar solvent so introduced, the solution of which separates out over time or by way of a centrifuge, and the non-polar phase containing the THCA is discarded or removed. Repetition of such process may be necessary depending on the amount of the THCA present.

The resulting solution after the step described above is a caustic target solution without any traces of the THCA. The next step is to make the caustic target solution without the THCA wholly acidic by using any acidic substance including but not necessarily limited to organic, inorganic, polyprotic, or mineral acids. The desired pH at this step may range from 1 to 3. Once the caustic target solution without the THCA is made wholly acidic, as specified above, the CBDA precipitates out in the form of a thick, nearly immovable, and visibly identifiable viscous oil that floats at the top of the solution. Then a non-polar solvent, such as phenolic, aromatic or aliphatic hydrocarbons as either a straight chain or an isomerized mixture, is used to dissolve the floating oil containing the CBDA i.e., the target compound, and remove the CBDA from the solution.

To achieve that, the CBDA contained in the viscous oil is dissolved in the non-polar solvent so introduced to the solution. To help the viscous oil with the CBDA to dissolve in the non-polar solvent, the batch is heated to between 30 to 60 degrees Celsius and preferably stirred, which may range in time required from 30 to 60 minutes. At this point, the viscous oil with the CBDA will be completely dissolved in the non-polar solvent, which may be easily observed because the resulting solution will be relatively clear without visible solids.

The resulting solution is expected to separate or phase out, over time or by way of a centrifuge, into two phases—1) the non-polar target solution containing the CBDA and traces of CBGA, and 2) the acidic aqueous phase containing various salts and water-soluble impurities. The acidic aqueous phase at this point must be discarded or removed leaving behind only the non-polar target solution containing the CBDA and traces of CBGA. Optionally and to make sure that all water is removed from the phase of the non-polar target solution containing the CBDA and traces of CBGA, the phase may then be treated with brine, diatomaceous earth, alumina, or activated charcoal to ensure proper dehydration of the phase.

Now, the solvent of the non-polar target solution containing the CBDA and traces of CBGA must be removed to receive the target compound in the form of CBDA oil. This step involves rotary evaporation technique to remove the solvent, which can be reclaimed for later use. The rotary evaporation or condensation is best done under vacuum at moderate heat to protect the integrity of the target compound, which will end up as an oil ranging in color from bright yellow to a deep red, depending on its potency and the integrity of input material. For clarification, please see the process diagram below and accompanying figures as an example of but one of a multitude of potential targeted process.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An Atmospheric Triphasic Chromatography (ATC) method comprising the steps of:

introducing a raw plant material containing cannabinoids into a non-polar solvent at a ratio of 5-20 ml of the non-polar solvent to 1 gram of the raw plant material;

extracting the cannabinoids from the raw plant material and removing the raw plant material;

dissolving the extracted cannabinoids in the non-polar solvent to obtain a target solution;

performing a potency analysis and a cannabinoid extract profile analysis of the target solution, wherein the potency analysis includes determining a total count of the extracted cannabinoids;

preparing an aqueous caustic solution by combining distilled water with a strong base including sodium hydroxide or potassium hydroxide, wherein the aqueous caustic solution is made by multiplying the total count of the extracted cannabinoids by a constant factor to establish a weight of the strong base relative to distilled water;

mixing the target solution with the aqueous caustic solution to obtain a mixture;

separating the mixture having the strong base into a first phase solution containing the non-polar solvent with fats, oils, pigments and other impurities and a second phase solution containing the aqueous caustic solution with cannabinoids;

removing the first phase solution to obtain a caustic target solution having a pH between 12.8 and 14;

acidifying the caustic target solution to bring the pH of the caustic target solution to a range of 10.5 and 12 thereby producing precipitation of an undesirable compound in the caustic target solution;

introducing the non-polar solvent to the caustic target solution to dissolve the undesirable compound thereby obtaining a blend;

separating the blend into a third phase solution having no trace of the undesirable compound and a fourth phase solution having the undesirable compound dissolved in the non-polar solvent;

removing the fourth phase solution to obtain a resulting caustic target solution that has no trace of the undesirable compound;

acidifying the resulting caustic target solution to a pH ranging from 1 to 3 to separate the resulting caustic target solution into a fifth phase solution and a sixth phase solution, the sixth phase solution having a layer of oil containing a target compound;

mixing the non-polar solvent with the target sixth phase solution thereby dissolving the sixth phase solution to produce a final mixture;

separating the final mixture into a non-polar target phase solution containing the target compound and an acidic aqueous phase solution, and removing the acidic aqueous phase solution; and removing the non-polar solvent from the non-polar target phase solution containing the target compound to obtain the target compound.

2. The ATC method of claim 1, wherein the performing a cannabinoid extract profile analysis comprises determining an amount of each of the extracted cannabinoids in proportion to one another.

3. The ATC method of claim 2, wherein the step of preparing the caustic solution comprises (a) converting or scaling up or down the total count of all of the extracted cannabinoids according to a batch size that is being used to make the aqueous caustic solution, and (b) multiplying the converted total count of all of the extracted cannabinoids by the constant factor to determine weight of the caustic solution to be mixed with the distilled water.

4. The ATC method of claim 1, wherein the first phase solution of the mixture comprises a non-polar solvent solution containing decarboxylated cannabinoids, fats, oils and pigments.

5. The ATC method of claim 4, wherein the decarboxylated cannabinoids comprise tetrahydrocannabinol (THC), cannabinol (CBN), cannabichromene (CBC) and cannabidiol (CBD).

6. The ATC method of claim 1, wherein the second phase solution of the mixture comprises an aqueous caustic solution containing tetrahydrocannabinolic acid (THCA), cannabidiolic acid (CBDA) and cannabigerolic acid (CBGA).

7. The ATC method of claim 6, wherein the undesirable compound is THCA.

8. The ATC method of claim 1, wherein the target compound is CBDA.

9. The ATC method of claim 1 further comprising treating, after the step of removing the acidic aqueous phase solution, the non-polar target phase solution containing the target compound with brine, diatomaceous earth, alumina, or activated charcoal to further dehydrate the non-polar target phase solution containing the target compound.

10. The ATC method of claim 1, wherein the step of removing the non-polar solvent from the non-polar target phase solution containing the target compound comprises using a rotary evaporation technique to remove the non-polar solvent.

11. The ATC method of claim 1, wherein the target compound is obtained in a form of a CBDA oil.

* * * * *